(12) United States Patent
Mohamed et al.

(10) Patent No.: US 9,128,230 B1
(45) Date of Patent: Sep. 8, 2015

(54) OPTICAL ABSORBER FOR LONG-WAVE INFRARED RADIATION

(71) Applicant: KING SAUD UNIVERSITY, Riyadh (SA)

(72) Inventors: Ehab Salaheldin Awad Mohamed, Riyadh (SA); Mohamed Ramy Abdel-Rahman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/608,119

(22) Filed: Jan. 28, 2015

(51) Int. Cl.
*G06K 7/10* (2006.01)
*G02B 26/00* (2006.01)
*G03C 11/00* (2006.01)
*H01L 29/06* (2006.01)
*G02B 5/00* (2006.01)

(52) U.S. Cl.
CPC ................ *G02B 5/008* (2013.01); *G02B 5/003* (2013.01)

(58) Field of Classification Search
CPC ...... G02B 5/208; G02B 26/001; G03F 7/001; G02F 1/0123; G02F 1/293; G02F 1/33; G03C 1/49881; B82Y 20/00; H01L 29/04; H01S 1/02; H01S 5/50; H01S 3/0625; H01S 3/141; H01S 3/107; H01S 5/026; H01S 3/225; B21D 53/00; H01J 37/28
USPC ......... 359/350, 237–240, 299, 310, 321, 248, 359/342, 344–345; 29/602.1, 417, 846; 372/20, 28, 44.01, 50.1, 55; 250/306; 430/2, 21; 257/17, 21, 79, 417, 662
See application file for complete search history.

(56) References Cited

U.S. PATENT DOCUMENTS

2003/0128364 A1\* 7/2003 Dickopf et al. ............... 356/445
2007/0081163 A1\* 4/2007 Liang et al. .................. 356/445

FOREIGN PATENT DOCUMENTS

CN     1978096 A     6/2007
(Continued)

OTHER PUBLICATIONS

Hao Jiang et al., "Optimization of gold nanoring arrays for biosensing in the fiber-optic communication window," 2013 Nanotechnology, Oct. 24, 2013. (Abstract only).
(Continued)

*Primary Examiner* — Dawayne A Pinkney
(74) *Attorney, Agent, or Firm* — Richard C Litman

(57) ABSTRACT

The optical absorber for long-wave infrared radiation includes a nano-plasmonic gold structure arrayed on an absorbing dielectric substrate in an alternating checkerboard-type pattern. A plurality of plasmonic cells are formed on an upper surface of the absorbing dielectric substrate, which can be, for example, a silicon nitride ($Si_3N_4$) substrate. The plurality of plasmonic cells are arrayed in a regular rectangular grid pattern, with each plasmonic cell having a plurality of elongated strips, each extending along an identical axis of orientation within the plasmonic cell. Adjacent ones of the plasmonic cells are oriented orthogonally with respect to one another, and each elongated strip includes a titanium layer formed on the upper surface of the absorbing dielectric substrate and a gold layer formed on the titanium layer, such that the titanium layer is sandwiched between the gold layer and the upper surface of the absorbing dielectric substrate.

20 Claims, 3 Drawing Sheets

(56) References Cited

FOREIGN PATENT DOCUMENTS

| | | |
|---|---|---|
| CN | 102488524 A | 6/2012 |
| CN | 102928381 A | 2/2013 |
| CN | 203325973 U | 12/2013 |

OTHER PUBLICATIONS

Ehab Awad, Mohamed Abdel-Rahman and Muhammad Fakhar Zia, "Checkerboard Nanoplasmonic Gold Structure for Long-Wave Infrared Absorption Enhancement," IEEE Photonics Journal, vol. 6, No. 4, cover page and 7 pages, Aug. 6, 2014.

* cited by examiner

OPTICAL ABSORBER FOR LONG-WAVE INFRARED RADIATION

BACKGROUND OF THE INVENTION

1. Field of the Invention

The present invention relates to optical absorbers for long-wave infrared (LWIR) radiation applications, such as photodetectors, microbolometers and the like, and particularly to the enhancement of LWIR absorption in a dielectric substrate in order to increase device responsiveness through the generation of surface plasmons on the dielectric surface.

2. Description of the Related Art

Long-wave infrared (LWIR) radiation detection has recently become quite important in a wide variety of civilian, military and law enforcement applications, such as, for example, target detection, medical monitoring, automotive driver assistance and the like. LWIR radiation has a wavelength range between approximately 8 micrometers (μm) and 12 micrometers (μm). LWIR is particularly important in applications requiring optical absorption, such as in photodetectors, microbolometers and the like, and enhancement of optical absorption in a dielectric layer is of critical importance to the improvement of detection quality, device responsiveness and sensitivity.

The surface plasmon phenomenon has recently found applications in optics and photonics, such as in, for example, plasmonic waveguides, enhanced transmission through apertures, enhanced photo-luminescence and Raman scattering spectroscopy. It would be desirable to be able to enhance optical absorption using surface plasmons. Surface plasmons occur when optical wavelength electromagnetic waves interact with a sub-wavelength metal object, resulting in conduction electron oscillations. The oscillating electrons give rise to nano-plasmonic electric fields that become confined within sub-wavelength resolution areas near the metal with very high magnitudes.

Recently, there has been progress in generating surface plasmon enhanced absorption in the long-wave infrared range. For example, surface plasmon waves have been used to enhance sensitivity of quantum-well infrared detectors by using a periodic array of holes in a gold thin film. Additionally, surface plasmon waves have been used to enhance sensitivity of quantum-dot infrared detectors for focal plane arrays by using corrugated gold metal and metal photonic crystals. Further, a long-wave infrared focal plane array with enhanced noise-equivalent temperature difference was demonstrated by using a backside configured sub-wavelength hole-array plasmonic structure. Moreover, concentric double C-shaped plasmonic structures were used to enhance optical absorption in uncooled microbolometer pixels. However, such techniques are not only typically experimental, but typically are relatively difficult and expensive to implement for device manufacture. Thus, it would be desirable to utilize surface plasmon enhancement of optical absorption in an absorber which could be readily and easily manufactured.

Thus, an optical absorber for long-wave infrared radiation addressing the aforementioned problems is desired.

SUMMARY OF THE INVENTION

The optical absorber for long-wave infrared (LWIR) radiation includes a nano-plasmonic gold structure arrayed on a dielectric substrate in an alternating checkerboard-type pattern. The gold structure enhances optical absorption of LWIR radiation in the dielectric substrate by induced localized surface plasmons. A plurality of plasmonic cells are formed on an upper surface of the absorbing dielectric substrate, which can be, for example, silicon nitride ($Si_3N_4$). The plurality of plasmonic cells are arrayed in a regular rectangular grid pattern, with each plasmonic cell having a plurality of elongated strips, each extending along an identical axis or substantially identical axis of orientation within the plasmonic cell. Adjacent ones of the plasmonic cells are oriented orthogonally with respect to one another, and each elongated strip includes a titanium layer formed on the upper surface of the absorbing dielectric substrate and a gold layer formed on the titanium layer, such that the titanium layer is sandwiched between the gold layer and the upper surface of the absorbing dielectric substrate. The silicon nitride dielectric layer forming the absorbing dielectric substrate can be further mounted on a silicon substrate.

The elongated strips within each plasmonic cell act as sub-wavelength optical antennas, where oscillating electrons accumulate at the strip edges, resulting in a spatial nano-resolution enhanced electric field. The localized surface plasmons accumulate optical energy and enhance the quality-factor in the vicinity of the metal, thus resulting in concentrated high optical intensities.

In an exemplary arrangement, the plurality of elongated strips within a single plasmonic cell can be provided as six elongated strips, such that the six elongated strips of each plasmonic cell are arrayed in three columns therein, with each column extending along the axis of orientation thereof. Each column is separated from the adjacent column by a sub-wavelength gap, and each plasmonic cell is separated from the adjacent plasmonic cell by a sub-wavelength gap. Exemplary dimensions for such an arrangement include each elongated strip having a length of approximately 1049 nm and a width of approximately 510 nm, with each plasmonic cell being spaced apart from the adjacent one of the plasmonic cells by a distance of approximately 530 nm. The gold layer of each elongated strip can have an exemplary thickness of approximately 50 nm and the titanium layer of each elongated strip can have an exemplary thickness of approximately 10 nm. The silicon nitride dielectric substrate corresponding to these exemplary dimensions can have a thickness of approximately 400 nm.

These and other features of the present invention will become readily apparent upon further review of the following specification.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1A:
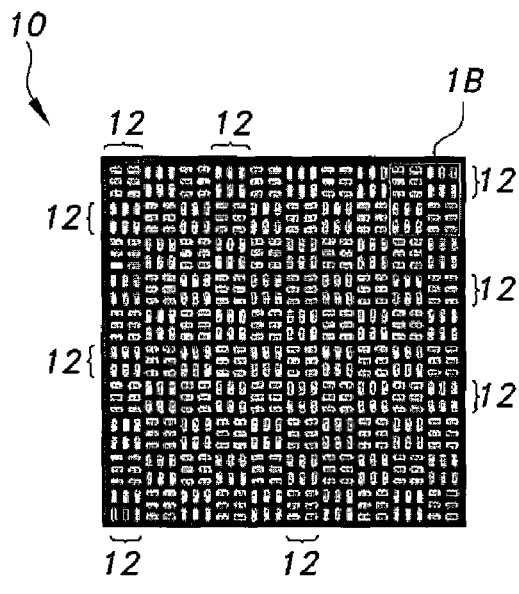
FIG. 1A is a plan view of an optical absorber for long-wave infrared radiation according to the present invention.
Figure 1B:
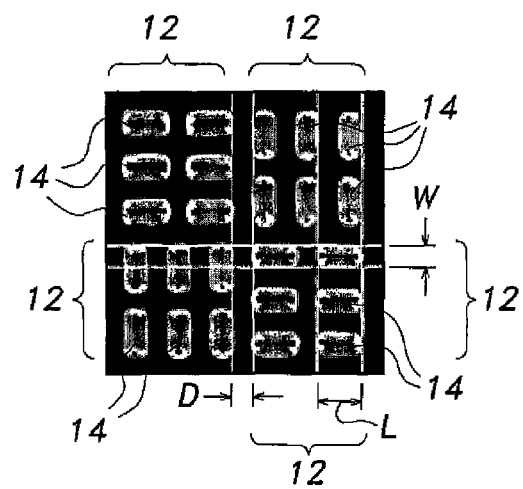
FIG. 1B is an enlarged view of four adjacent plasmonic cells of the optical absorber for long-wave infrared radiation of FIG. 1A.

As shown in FIGS. 1A and 1B, an optical absorber for long-wave infrared (LWIR) radiation 10 includes a nanoplasmonic gold structure arrayed on an absorbing dielectric substrate 16 in an alternating checkerboard-type pattern. The gold structure enhances optical absorption of LWIR radiation in the absorbing dielectric substrate 16 by induced localized surface plasmons. As shown, a plurality of plasmonic cells 12 are formed on an upper surface of the absorbing dielectric substrate 16, which can be, for example, silicon nitride ($Si_3N_4$). The plurality of plasmonic cells 12 are arrayed in a regular rectangular grid pattern. It should be understood that any suitable dielectric material can be utilized for absorbing dielectric substrate 16, such as higher refractive-index materials, for example, silicon, gallium-arsenide (GaAs), germanium or the like, as can depend on the use of application, and should not be construed in a limiting sense.

Figure 1C:
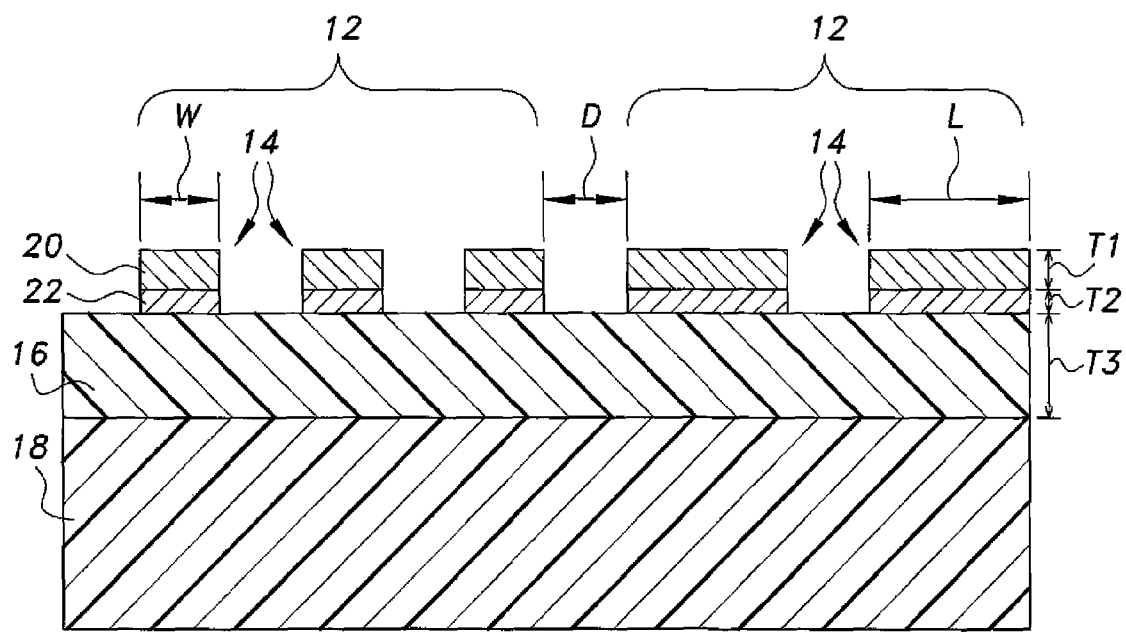
FIG. 1C is a schematic sectional view of two adjacent plasmonic cells of the four adjacent plasmonic cells of the optical absorber for long-wave infrared radiation of FIG. 1B.

FIG. 1B illustrates four such plasmonic cells 12, with each plasmonic cell 12 having a plurality of elongated strips 14, each extending along an identical or substantially identical axis of orientation within the plasmonic cell 12. Adjacent ones of the plasmonic cells 12 are oriented orthogonally with respect to one another, so as to form the checkerboard-type pattern, as best seen in FIG. 1A. Also, the elongated strips 14 of a plasmonic cell 12 are oriented orthogonally with respect to the elongated strips 14 of an adjacent, opposing plasmonic cell 12, as best seen in FIG. 1B. As shown in FIG. 1C, each elongated strip 14 includes a titanium layer 22 formed on the upper surface of the absorbing dielectric substrate 16 and a gold layer 20 formed on the titanium layer 22, such that the titanium layer 22 is sandwiched between the gold layer 20 and the upper surface of the absorbing dielectric substrate 16. The silicon nitride dielectric layer forming the absorbing dielectric substrate 16 can be further mounted on a silicon substrate 18, as shown.

The elongated strips 14 within each plasmonic cell 12 act as sub-wavelength optical antennas, where oscillating electrons accumulate at the strip edges, resulting in a spatial nano-resolution enhanced electric field. The localized surface plasmons accumulate optical energy and enhance the quality-factor in the vicinity of the metal, thus resulting in concentrated high optical intensities. The alternating, checkerboard-type arrangement of the plasmonic cells 12 in the rectangular grid formed on the absorbing dielectric substrate 16 enhances ensuring a polarization-independent spectral-response of the structure of the optical absorber 10.

In the exemplary arrangement of FIGS. 1A and 1B, the plurality of elongated strips 14 within a single plasmonic cell 12 are provided as six such elongated strips, for example, such that the six elongated strips 14 of each plasmonic cell 12 are arrayed in three columns therein, with each column extending along the axis of orientation thereof. Each column is separated from the adjacent column by a sub-wavelength gap, and each plasmonic cell 12 is separated from the adjacent plasmonic cell 12 by a sub-wavelength gap. Exemplary dimensions for such an arrangement include each elongated strip 14 having a length L of approximately 1049 nm and a width W of approximately 510 nm, with each plasmonic cell 12 being spaced apart from the adjacent one of the plasmonic cells by a distance D of approximately 530 nm. The gold layer 20 of each elongated strip 14 can have an exemplary thickness T1 of approximately 50 nm and the titanium layer 22 of each elongated strip 14 can have an exemplary thickness T2 of approximately 10 nm. The silicon nitride layer forming the absorbing dielectric substrate 16 corresponding to these exemplary dimensions can have a thickness T3 of approximately 400 nm. In FIG. 1A, the optical absorber 10 is shown as a ten-by-ten array of plasmonic cells 12. It should be understood that any suitable size for the optical absorber 10 can be produced, as can depend on the use or application, and should not be construed in a limiting sense. For the exemplary arrangement shown in FIG. 1A, the square absorbing dielectric substrate 16 has dimensions of approximately 30×30 $\mu m^2$. As noted above, the dimensions are selected to be in sub-wavelengths of the optical wavelength $\lambda$, thus, $L=\lambda/10$; $W \approx D \approx \lambda/20$; and $T1=\lambda/200$ for a wavelength of $\lambda=10$ micrometers ($\mu m$), for example.

The plasmonic cell structure of the plasmonic cells 12 can be patterned on the absorbing dielectric substrate 16 by any suitable process, such as by electron-beam lithography using a modified scanning electron microscope (SEM). Such modifications for SEMs are commercially available, such as, for example, a modified ZEISS MA10 SEM with the ELPHY Quantum nanolithography module, manufactured by Raith Nanofabrication of Germany. Using such a system, the SEM's cathode, such as a LaB6 cathode, can be operated at an accelerating voltage of approximately 30 kilovolts (kV), with an exposure current of 11.5 picoamperes (pA). A bilayer resist process can further be used. For example, a bottom layer of copolymer methyl methacrylatemethacrylic acid (MMA-MAA), having a thickness of approximately 350 nm, was baked for approximately 10 minutes (min) on a hotplate at a temperature of 180 degrees centigrade (° C.). A corresponding top layer of 495-K polymethyl methacrylate (PMMA), having a thickness of approximately 150 nm, was also be baked for 10 min on a hotplate at approximately 180° C. The checkerboard gold structures were then exposed in a 100×100 $\mu m^2$ write field at an area dose of approximately 315 microcoulombs ($\mu C$)/centimeters$^2$ (cm$^2$) with a 1 microsecond ($\mu s$) dwell time. The resist was then developed for approximately 30 seconds (s) in a 1:3 mixture of methyl-isobutylketone:isopropanol (MIBK:IPA). After patterning of the checkerboard structure, a 10 nm thick film of titanium was deposited using direct current (DC) sputtering at 150 watts (W) at a chamber base pressure of $2\times10^{-6}$ Torr and an argon pressure of 3 millitorr (mTorr). Immediately afterwards, 50 nm of gold was deposited using DC sputtering at the same sputtering conditions that were used for depositing the titanium. Liftoff was then performed to remove all of the excess metal.

To theoretically analyze and characterize the checkerboard structure of an embodiment of the optical absorber 10, a three-dimensional finite-difference time domain (FDTD) simulation was performed, such as by using Lumerical software, for example. Plasmonic intensity distributions on a silicon nitride ($Si_3N_4$) layer surface, for example, due to four cross-oriented plasmonic cells 12 (as in FIG. 1B) were analyzed for both transverse-magnetic (TM) and transverse-electric (TE) polarized normal-incident plane-waves at a wavelength of 10.6 $\mu m$. The incident electric field on the sub-wavelength gold strips was shown to induce collective conduction electron oscillations (dipoles) in the direction of the polarized incident electric-field. The oscillating charges were seen to accumulate at the strip edges and corners, such as of the strips 14, creating a localized surface plasmon field of high intensity in the vicinity of metal. The confined electric field was found to have the highest intensity at the strip corners, followed by lower intensity at the strip edges, which were perpendicular to the incident electric field polarization. Additionally, the strip aspect ratio (2:1) allowed the narrow edges to develop much higher intensities than the wide edges of the strips 14. The sub-wavelength gaps between the gold strips 14 resulted in coupled plasmonic fields (in-phase oscillating dipoles), and thus greater enhanced optical intensities within the gaps (i.e., the formation of hot spots). The maximum intensity of an embodiment of the optical absorber 10 was found to be almost twelve times that of a similar device without the checkerboard-type gold structure. The intensity distribution for the TE case looked similar to that of the TM case with a 90° rotation, due to the cross-oriented cell configuration. This indicates that the same amount of optical power is collected by the total device area for each polarization and, thus, the device is polarization-independent for the optical absorber 10.

Further, analyzing a vertical cross-section in plasmonic intensity distribution of two cross-oriented plasmonic cells 12 (as in FIG. 1C) for the case of a TM normal-incident plane wave at a wavelength of 10.6 µm, the intensity spread inside the silicon nitride ($Si_3N_4$) layer forming the absorbing dielectric substrate 16 was found to almost vanish at the layer bottom surface, indicating absorption of most transmitted optical power inside this layer. The hot spots were found to have their greatest intensities in the gaps between coupled collinear-strips 14.

Figure 2A:
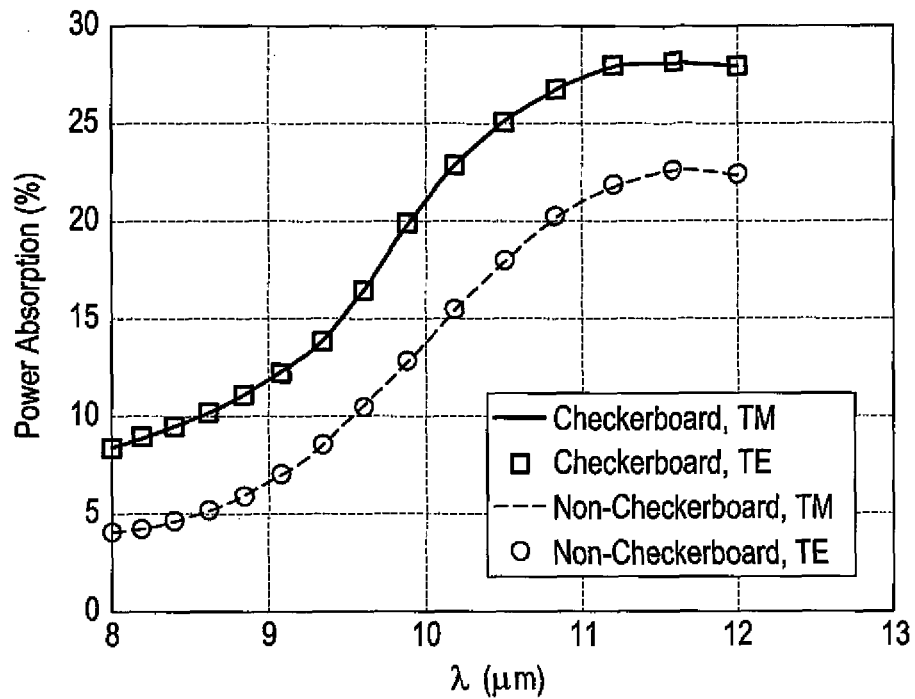
FIG. 2A is a graph showing absorption spectral response of the optical absorber for long-wave infrared radiation compared against a control sample of non-patterned silicon nitride.

FIG. 2A shows the absorption spectral-response of the device within the 8-12 µm wavelength range for both TE and TM polarizations at normal incidence, comparing the optical absorber 10 against a similar device without the checkerboard-type gold structure. In reference to FIG. 2A, absorption is defined as the ratio of total absorbed power to total incident power. It is readily apparent that the spectral response for the optical absorber 10 device increases over the entire wavelength range while maintaining the response shape, thus indicating a broadband enhancement. Although the plasmonic field distribution should be dependent on TM and TE polarizations, as described above, the absorption improvement is polarization-independent because of the cross-oriented checkerboard-type plasmonic cells 12. The calculated average absorption over this 8-12 µm wavelength range for optical absorber 10 device is 18%, and in the case of the device without the checkerboard-type gold structure is 12.25%, corresponding to a 5.75% improvement in average absorption, for example.

Figure 2B:
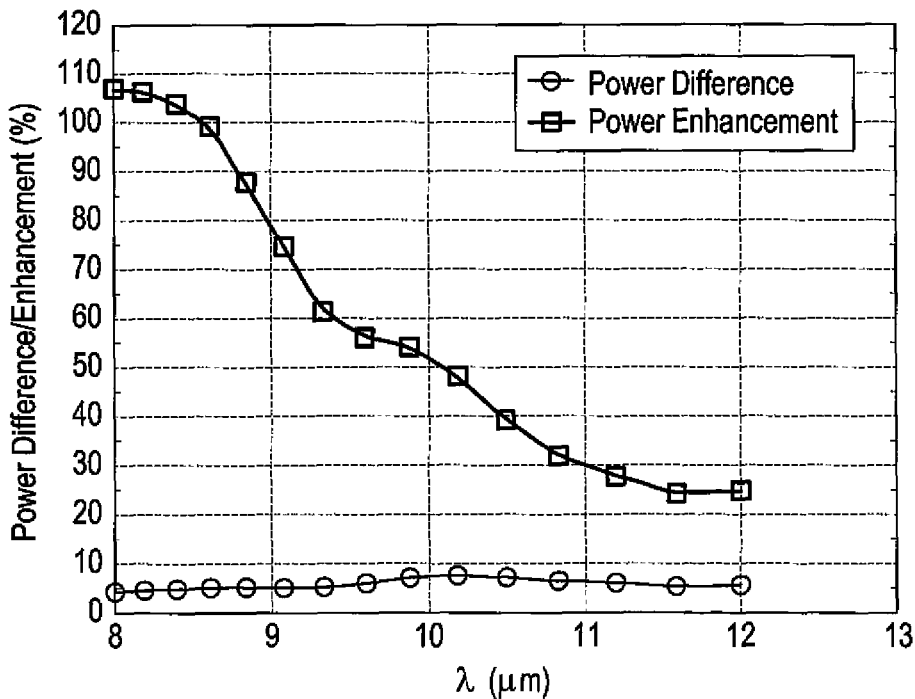
FIG. 2B is a graph showing power difference in absorption spectral response of the optical absorber for long-wave infrared radiation compared against the control sample of non-patterned silicon nitride.

FIG. 2B shows the amount of absorption improvement (i.e., difference) for different wavelengths inside this 8-12 µm wavelength range. The maximum absorption difference is 7.5% at a 10.2 µm wavelength, for example. The absorption enhancement is defined here as the ratio between absorption-difference to absorption without the checkerboard-type gold structure. The optical absorber 10 device shows an average spectral absorption enhancement of 63.2% over the entire wavelength range, with a maximum of 107% at 8 µm and a minimum of 24.8% at 12 µm, for example.

Figure 2C:
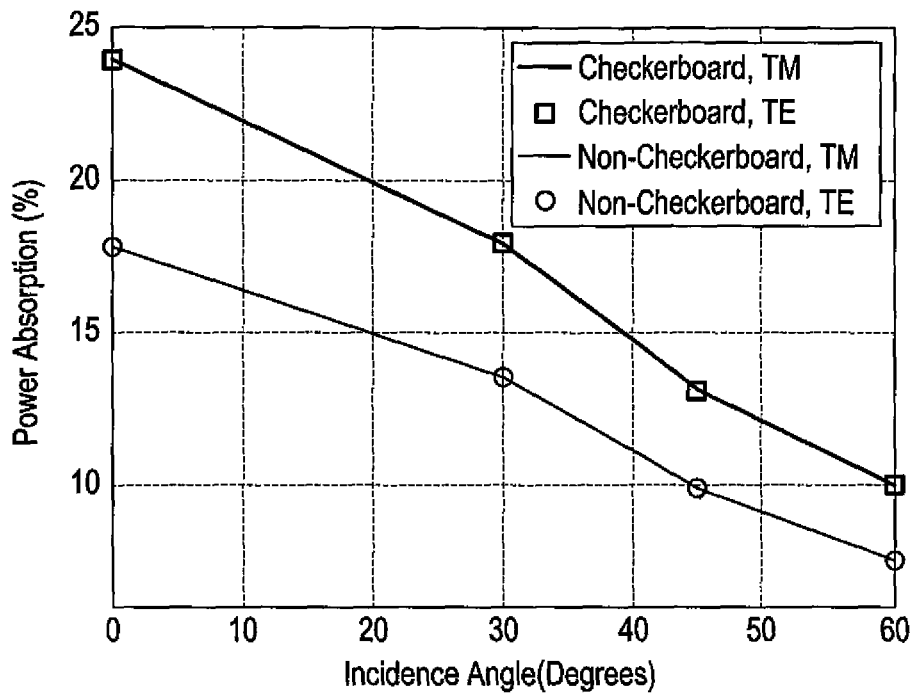
FIG. 2C is a graph showing absorption as a function of incidence angle for the optical absorber for long-wave infrared radiation compared against the control sample of non-patterned silicon nitride.
Figure 2D:
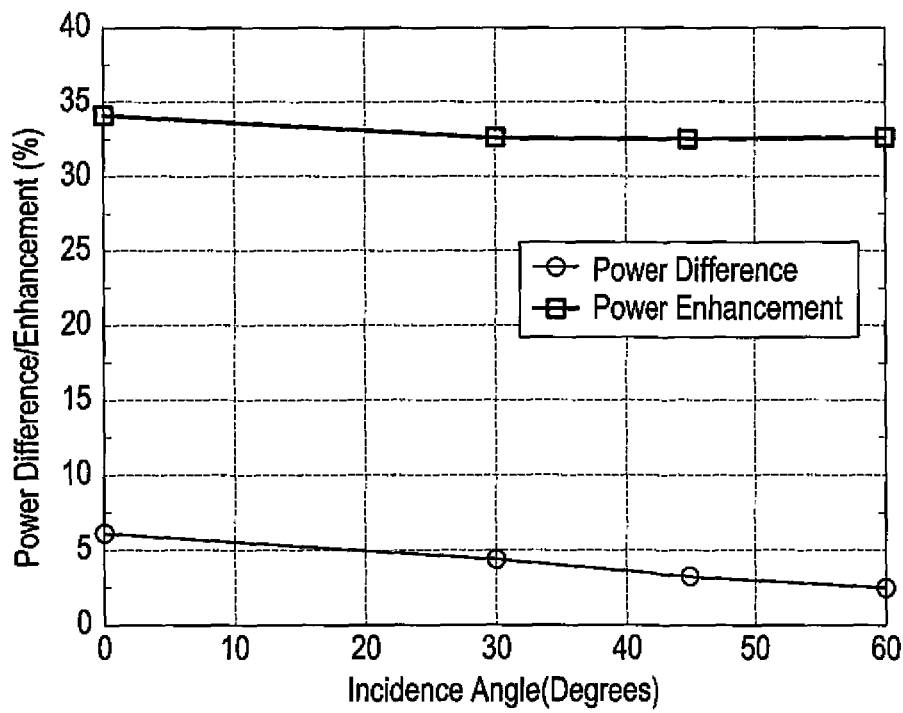
FIG. 2D is a graph showing power difference in absorption as a function of incidence angle for the optical absorber for long-wave infrared radiation compared against the control sample of non-patterned silicon nitride.

FIG. 2C shows the change in absorption with incidence angle (0° to 60°) at a 10.6 µm wavelength for both TE and TM polarizations, both with and without the checkerboard-type gold structure. The change in enhanced absorption with incident angle is polarization-independent. FIG. 2D shows both the difference and enhancement in absorbed power as a function of incidence angle. When the incidence angle changes from 0° to 60°, the enhanced total absorption degrades by only 1.56%, while, on the other hand, the total absorption without the checkerboard-type gold structure degrades by as much as 3.6%, for example. It should be noted that the calculated absorption in the gold checkerboard-type layer alone is less than 1.5% for all the LWIR range and incidence angles, which can be considered negligible when compared to the calculated total absorption in FIGS. 2A and 2C. This indicates that most of the incident power absorption occurs in the silicon nitride ($Si_3N_4$) layer.

Testing and measurements of induced plasmonic electric fields of an embodiment of the optical absorber 10 were performed using a commercial scattering-type scanning near-field optical microscope (SNOM). The microscope operated in the reflection mode. For sample excitation, a LWIR illumination unit (a $CO_2$ laser) was used to irradiate the sample at a 60° incidence angle. To collect the scattered near-field, a pseudo-heterodyne detection module was used. A conventional silicon cantilever tip coated with platinum-iridium (Pt—Ir) acted as a scattering near-field probe with a lateral resolution of 10 nm. To suppress any background contributions, the detected optical signal was demodulated at higher harmonics of the cantilever oscillation frequency. The electric field magnitude was analyzed in arbitrary units (a.u.), scattered off the sample optical absorber 10 device. The incident field was TM polarized with a wavelength of 10.19 µm and a 60° incidence angle. On average, the highest field magnitude at the gold strips 14 (3.3 a.u.) was almost 2.54 times that of the silicon nitride ($Si_3N_4$) surface (1.3 a.u.). Comparing this against numerical simulations, in simulation, on average, the highest field magnitude at the gold strips 14 (1.2 volts/meter (V/m)) was almost 2.4 times that of the silicon nitride ($Si_3N_4$) surface (0.5 V/m), which is in a good agreement with the SNOM measurement.

It should be noted that an irregular field magnitude distribution over the gold strips 14 found in the SNOM measurement was due to fabrication imperfections, such as strip round-corners, un-sharp edges, and residual e-beam resist, for example. Measurement comparison between the SNOM scattered field, at a wavelength of 10.6 µm, for the checkerboard-type area on the optical absorber 10 and a neighboring area on the sample, prepared without the checkerboard-type pattern, shows that, on average, the scattered field magnitude at the non-patterned area (0.8 a.u.) was almost 1.6 times that of the area underneath the checkerboard-type patterning (0.5 a.u.). This difference was due to enhanced power absorption in the checkerboard-type area of the optical absorber 10 device (i.e., less scattered electric field). The variation in field magnitudes corresponds to a change in absorbed optical power; i.e., $1.6^2=2.56$, which agrees very well with the simulation results of FIG. 2D (the lower curve) at an incidence angle of 60°, for example.

It is to be understood that the present invention is not limited to the embodiments described above, but encompasses any and all embodiments within the scope of the following claims.

We claim:

1. An optical absorber for long-wave infrared radiation, comprising:
   an absorbing dielectric substrate having opposed upper and lower surfaces; and
   a plurality of plasmonic cells formed on the upper surface of said absorbing dielectric substrate, wherein said plurality of plasmonic cells are arrayed in a regular rectangular grid pattern, each said plasmonic cell comprising a plurality of elongated strips each extending along an identical axis of orientation within said plasmonic cell, wherein adjacent ones of said plasmonic cells are oriented orthogonally with respect to one another, each said elongated strip comprising a titanium layer formed on the upper surface of said absorbing dielectric substrate and a gold layer formed on the titanium layer, such that the titanium layer is sandwiched between the gold layer and the upper surface of said absorbing dielectric substrate.

2. The optical absorber for long-wave infrared radiation as recited in claim 1, wherein said absorbing dielectric substrate comprises silicon nitride.

3. The optical absorber for long-wave infrared radiation as recited in claim 1, wherein the plurality of elongated strips of each said plasmonic cell comprise six elongated strips.

4. The optical absorber for long-wave infrared radiation as recited in claim 3, wherein the six elongated strips of each said plasmonic cell are arrayed in three columns within the plasmonic cell, each column extending along the axis of orientation thereof.

5. The optical absorber for long-wave infrared radiation as recited in claim 1, wherein each said elongated strip has a length of approximately 1049 nanometers (nm) and a width of approximately 510 nm.

6. The optical absorber for long-wave infrared radiation as recited in claim 5, wherein each said plasmonic cell is spaced apart from the adjacent one of the plasmonic cells by a distance of approximately 530 nm.

7. The optical absorber for long-wave infrared radiation as recited in claim 6, wherein the gold layer of each said elongated strip has a thickness of approximately 50 nm.

8. The optical absorber for long-wave infrared radiation as recited in claim 7, wherein the titanium layer of each said elongated strip has a thickness of approximately 10 nm.

9. An optical absorber for long-wave infrared radiation, comprising:
a silicon nitride substrate having opposed upper and lower surfaces; and
a plurality of plasmonic cells formed on the upper surface of said silicon nitride substrate, wherein said plurality of plasmonic cells are arrayed in a regular rectangular grid pattern, each said plasmonic cell comprising a plurality of elongated strips each extending along an identical axis of orientation within said plasmonic cell, wherein adjacent ones of said plasmonic cells are oriented orthogonally with respect to one another, each said elongated strip comprising a titanium layer formed on the upper surface of said silicon nitride substrate and a gold layer formed on the titanium layer, such that the titanium layer is sandwiched between the gold layer and the upper surface of said silicon nitride substrate.

10. The optical absorber for long-wave infrared radiation as recited in claim 9, further comprising:
a silicon substrate having opposed upper and lower surfaces, the lower surface of said silicon nitride substrate being mounted on the upper surface of the silicon substrate.

11. The optical absorber for long-wave infrared radiation as recited in claim 9, wherein the plurality of elongated strips of each said plasmonic cell comprise six elongated strips.

12. The optical absorber for long-wave infrared radiation as recited in claim 11, wherein the six elongated strips of each said plasmonic cell are arrayed in three columns within the plasmonic cell, each column extending along the axis of orientation thereof.

13. The optical absorber for long-wave infrared radiation as recited in claim 12, wherein each said elongated strip has a length of approximately 1049 nanometers (nm) and a width of approximately 510 nm.

14. The optical absorber for long-wave infrared radiation as recited in claim 13, wherein each said plasmonic cell is spaced apart from the adjacent one of the plasmonic cells by a distance of approximately 530 nm.

15. The optical absorber for long-wave infrared radiation as recited in claim 14, wherein the gold layer of each said elongated strip has a thickness of approximately 50 nm.

16. The optical absorber for long-wave infrared radiation as recited in claim 15, wherein the titanium layer of each said elongated strip has a thickness of approximately 10 nm.

17. The optical absorber for long-wave infrared radiation as recited in claim 16, wherein said silicon nitride substrate has a thickness of approximately 400 nm.

18. The optical absorber for long-wave infrared radiation as recited in claim 17, further comprising:
a silicon substrate having opposed upper and lower surfaces, the lower surface of said silicon nitride substrate being mounted on the upper surface of the silicon substrate.

19. The optical absorber for long-wave infrared radiation as recited in claim 9, wherein the elongated strips within a plasmonic cell are oriented orthogonally with respect the elongated strips within an adjacent opposing plasmonic cell.

20. The optical absorber for long-wave infrared radiation as recited in claim 9, wherein the plurality of plasmonic cells form a checkerboard pattern on the optical absorber.

* * * * *